C. S. BOOTHBY.
Hay Carrier
No. 102,651.    Patented May 3, 1870.
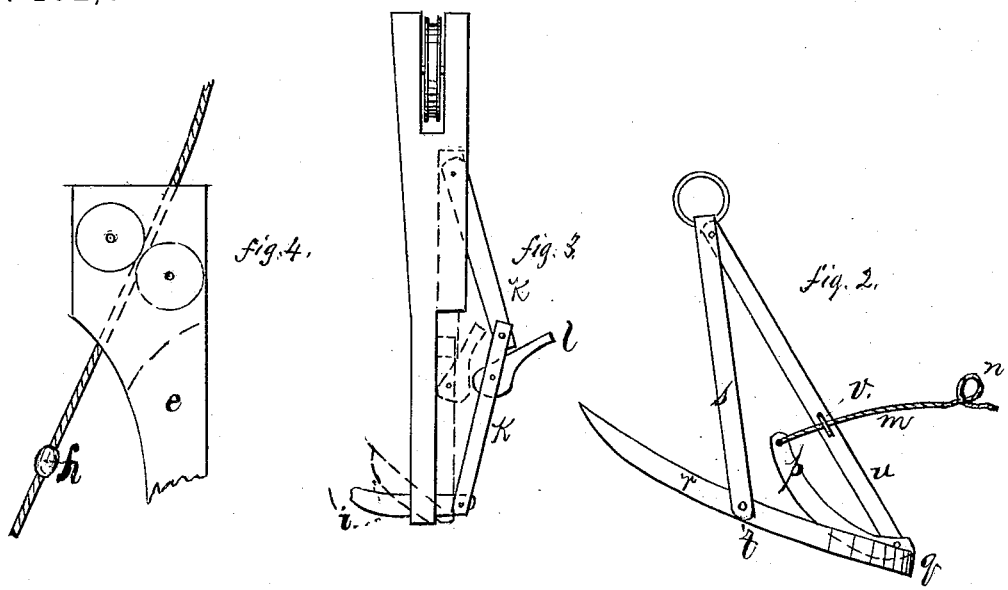
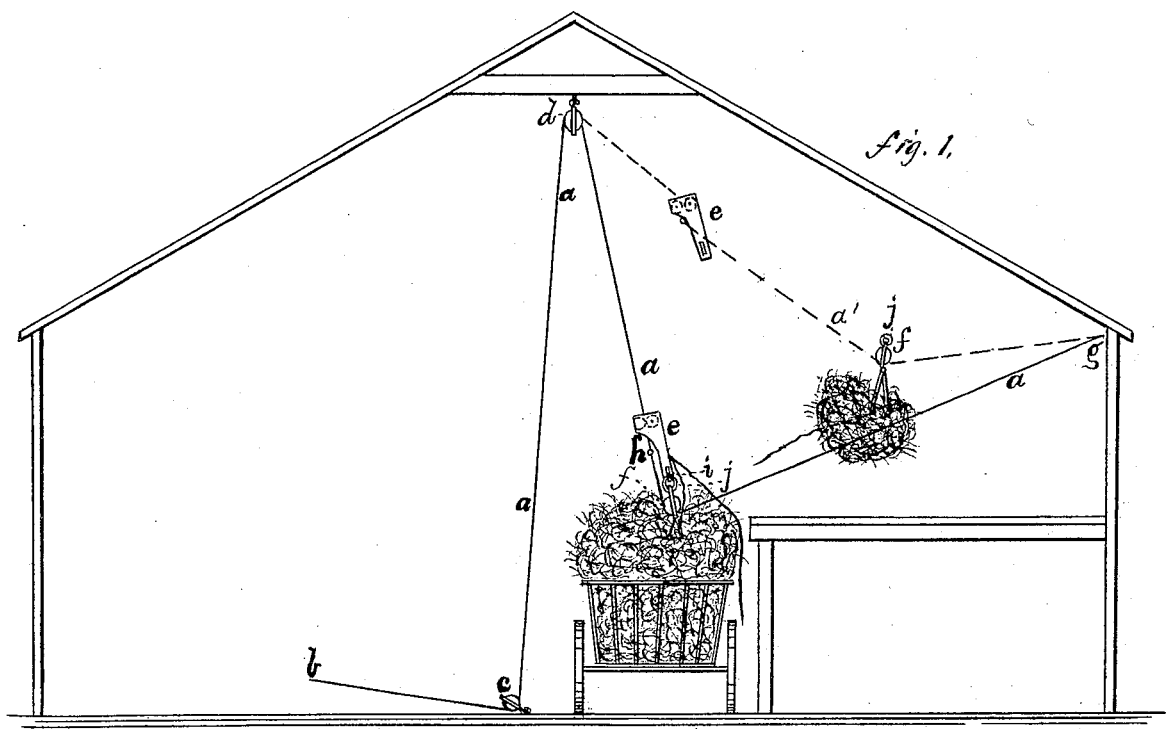

United States Patent Office.

COLUMBUS S. BOOTHBY, OF SACO, MAINE.

Letters Patent No. 102,651, dated May 3, 1870.

IMPROVED HAY-CARRIER.

The Schedule referred to in these Letters Patent and making part of the same.

*To all whom it may concern:*

Be it known that I, COLUMBUS S. BOOTHBY, of Saco, in the county of York and State of Maine, have invented a new and useful improved Hay-Fork; and I do hereby declare the following to be a full, clear, and exact description thereof, which will enable others to make and use my invention, reference being had to the accompanying drawings forming part of this specification, in which—

Figure 1 is a view of a barn and rack of hay, and illustrates the general operation of my invention.

Figure 2 is a side view of the fork.

Figure 3 is an edge view of the dog used to elevate the fork and deposit the load thereof.

Figure 4 is an enlarged view of a portion of the dog, showing the pulleys, the cord, and the burr.

My invention has for its object the providing of an improved apparatus for unloading hay from a rack and depositing it on a mow or in a bay.

In the drawing—

*a* shows a cord, which, at *b*, is connected with the power or animal that hoists the hay when loaded on the fork.

This cord passes through the snatch-block *c*, on or near the barn-floor, then up through a pulley, *d*, near the ridge-pole of the building, then down through the dog *e*, and around a pulley, *f*, on the upper end of the fork, and is then fastened to the walls of the barn, near the eaves, as at *g*, over the mow, where the hay is to be placed.

Let the fork be supposed to be loaded and in the rack, as shown in the drawing, fig. 1, by the black lines. The cord *a* is then drawn on the floor at *b*, and it will slip around the pulley *f*, on the fork, and between the two pulleys in the upper end of the dog *e* till the burr *h* comes between the two pulleys in the dog, between which it cannot pass. Then the dog will begin to raise the fork, by means of the hook *i* on the dog, which has been previously entered into the ring *j* on the fork.

When the fork, with its load, is raised sufficiently high toward the pulley or block *d*, the cord will then be in nearly the position shown by the dotted lines in fig. 1. The fork is then detached from the hook of the dog, the operation being by means of the devices shown in fig. 3.

The hook *i* is passed through a slit in the lower end of the dog, and is pivoted to the toggle *k*. This toggle, when resting against the side of the dog, is slightly bent inwardly or crooked, and will thus keep the hook *i* turned upwardly, as illustrated by the dotted lines in fig. 3.

A small lever, *l*, is pivoted to one arm of the toggle, which will, when drawn down, bend out the toggle, and the weight of the fork with its load will then pull the hook down, the fork will slip off, and thus release itself from the hook, and the fork, with its load, will then slip or slide down the inclined part of the cord *a'*, shown by the dotted line n fig. 1, to the place desired over the mow.

The lever *l* is drawn down as above described, and the toggle consequently bent, by means of the cord *m*, with the loop *n* therein, which, when the fork and dog are in the rack, before being hoisted, is slipped over the projecting part of the lever *l*.

This loop *n* is on the cord *m*, which cord is attached to the catch *p*, which aids in unloading the fork.

When the fork, with its load, has reached the desired position over the mow, the cord *m* is again pulled downward, which throws off the catch *p* from the bottom *q* of the fork, and the weight of the hay thereon trips the tines *r* downward and the hay drops off.

The line or rope *a* is then slacked up, and the fork and dog then both descend again to the rack to be again loaded, or, the fork may be drawn down by its line *m*.

The changed position of the dog and fork, when the line *a* is drawn so as to bring the burr *h* into operation, and the fork has been detached by means of the line *m* and its loop *n*, is shown in fig 1 by the fork and dog shown on the dotted line therein.

The construction of the fork is follows:

The tines are of one piece of metal, curved to form the back, see *r*, fig. 2

The two pieces *s*, to which the tines are pivoted at *t*, so as to allow them to tip to tip, and the piece *u*, to which is pivoted the catch *p*, to release the tines when the load is to be discharged, compose the other parts of the fork.

The piece *u* keeps the tines up till the said piece is thrown off, the catch *p* operating to do this. The catch is pivoted to *u*, as illustrated, and when the end to which the line is attached is drawn, it throws off the lower end of *u* from the back of the tines.

The staple *v* is to pass the line through, (see fig. 2.) The catch has a small shoulder to fit over the edge of the curved back of the tines. The line attached to the fork, in fig. 1, which is shown on the dotted line, shows the position of the line *m* when the fork is separated from the dog, and the load can thus be thrown off the fork by the person standing on the rack.

By marks on the line *m*, the exact position where it is desired to deposit the load can be reached without any one to watch the fork or to stow away the hay, and the position may be varied at the will of the operator.

What I claim as my invention, and desire to secure by Letters Patent, is—

The arrangement of the line *a*, having the burr *h*, in connection with the fork, as shown in fig 2, and the dog *e*, as described, to operate as set forth.

Witnesses:     COLUMBUS S. BOOTHBY.
  WM. H. CLIFFORD,
  HENRY C. HOUSTON.